(12) United States Patent
Asbury, III

(10) Patent No.: US 6,829,036 B1
(45) Date of Patent: Dec. 7, 2004

(54) MODULAR REMOVABLE DIGITAL IMAGE APPARATUS

(76) Inventor: Louis H. Asbury, III, 1711 Brandon Rd., Charlotte, NC (US) 28207

(*) Notice: Subject to any disclaimer, the term of this patent is extended or adjusted under 35 U.S.C. 154(b) by 0 days.

(21) Appl. No.: 09/566,419

(22) Filed: May 5, 2000

Related U.S. Application Data

(60) Provisional application No. 60/132,798, filed on May 6, 1999.

(51) Int. Cl.[7] .................. G03B 27/32; G03B 27/72; H04N 1/21
(52) U.S. Cl. .................. 355/32; 355/35; 358/1.9; 358/302
(58) Field of Search .................. 355/32, 35, 38; 358/1.9, 501, 518, 302, 512, 1.1; 347/226, 232

(56) References Cited

U.S. PATENT DOCUMENTS

| | | | |
|---|---|---|---|
| 3,980,405 A | 9/1976 | Tatsuno | 355/20 |
| 4,394,089 A | 7/1983 | McIntosh | 355/88 |
| 4,457,618 A | 7/1984 | Plummer | 355/20 |
| 4,511,925 A | 4/1985 | Mackenroth, III | 358/244 |
| 4,566,767 A | 1/1986 | Akisada | 354/76 |
| 4,615,596 A | 10/1986 | Müller et al. | 354/76 |
| 4,676,628 A | 6/1987 | Asbury, III | 355/38 |
| 4,769,715 A | 9/1988 | Feldman | 358/244 |
| 4,771,343 A | 9/1988 | Takenaka | 358/335 |
| 4,782,395 A | 11/1988 | Jeffers | 358/244 |
| 4,835,557 A | 5/1989 | Gandolfo et al. | 354/76 |
| 4,942,462 A | 7/1990 | Shiota | 358/76 |
| 4,943,861 A | 7/1990 | Lambert | 358/244 |
| 4,947,204 A | 8/1990 | Endo | 355/20 |
| 4,996,552 A | 2/1991 | Sangyoji et al. | 355/1 |
| 5,027,220 A | 6/1991 | Sunda | 358/244 |
| 5,030,986 A | 7/1991 | Dwyer, III | 355/20 |
| 5,036,402 A | 7/1991 | Shiota | 358/244 |
| 5,041,914 A | 8/1991 | Ban | 358/110 R |
| 5,045,949 A | 9/1991 | Shiota | 358/244 |
| 5,303,056 A | 4/1994 | Constable | 358/350 |
| 5,337,119 A | * 8/1994 | Tanibata | 355/40 |
| 5,383,027 A | 1/1995 | Harvey | 358/296 |
| 5,400,152 A | 3/1995 | Manico | 358/501 |
| 5,416,515 A | 5/1995 | Arai | 348/229 |
| 5,432,580 A | 7/1995 | Tokuda | 354/298 |
| 5,859,689 A | * 1/1999 | Tanibata | 355/50 |

* cited by examiner

Primary Examiner—Alan A. Mathews
(74) Attorney, Agent, or Firm—Dougherty, Clements Hofer, & Bernard

(57) ABSTRACT

A method and apparatus for creating a digital image on photographic paper and subsequent correction of color. The method and apparatus provides a digital image printer that is capable of rapidly producing digital images on photographic paper having good clarity and sharpness and correct color content. Further, the method and apparatus provides a digital image printer having a controllable lamp house that is easily removable and may be coupled with conventional photographic printers. The apparatus is a digital printer having a central processor for retrieving digital images stored on a file and for creating an inverted image of the digital images, a projecting means controller that is electrically connected to the central processor, an imaging means that is electrically connected to the projecting means controller for creating and transmitting a color corrected image, a lamp house that is positioned adjacent the imaging means for creating an optical signal and modulating the spectral content of the optical signal, a spectral content analyzer that is attached to the lamp house, a lamp house controller coupled to the lamp house, a lens system for focusing the color corrected image onto photographic paper, and a paper drive means having a supply and take-up for providing and advancing photographic paper.

20 Claims, 3 Drawing Sheets

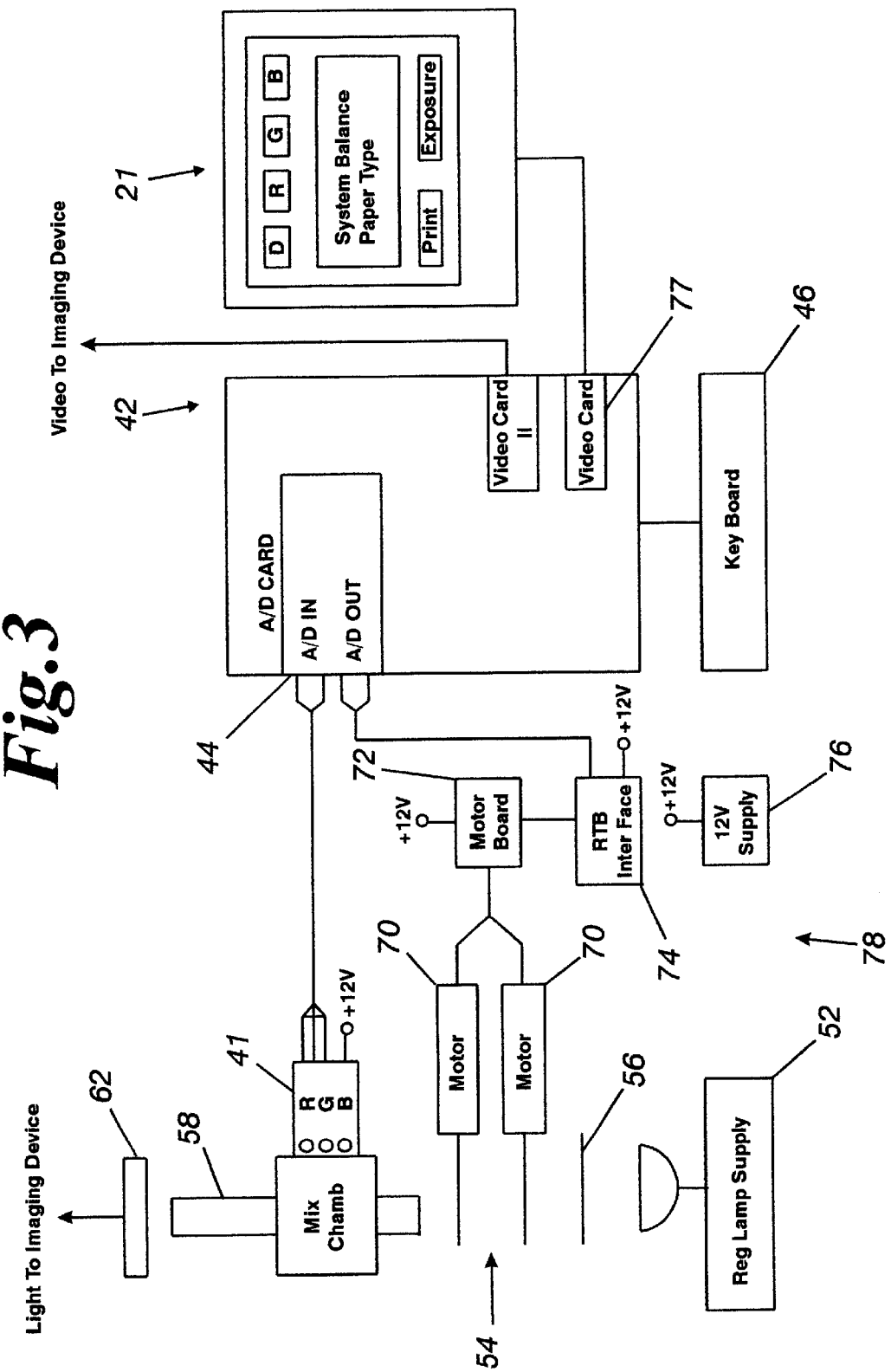

MODULAR REMOVABLE DIGITAL IMAGE APPARATUS

REFERENCE OF RELATED APPLICATION

This application claims the benefit of U.S. Provisional Application No. 60/132,798, filed May 6, 1999.

FIELD OF THE INVENTION

The present invention relates generally to printing of digital images onto photographic paper, and more particularly to removable apparatus for producing photographs on photographic paper from digital images having a means for color correction.

BACKGROUND OF THE INVENTION

Color and black and white photography are a popular pastime for capturing memorable moments in time. One difficulty with photography, particularly color photography, is the production of photographs having a good image clarity, or sharpness, and having correct color. Conventional printers utilize a complex and expensive optical system and projector for producing images from negatives on photographic paper. After a negative has been developed, the procedure is typically to project light through the negative and focus the image onto the photographic paper. With respect to the printer itself and disregarding the photographic paper, the optical system and the lamp house are responsible for the quality of the image. The lamp house is also responsible for the color content of the resulting photograph. In color photographic printing, the process involves projecting light which has been filtered with the use of dichroic filters to correctly manage the spectrum of light so that the characteristics of the film negative and the characteristics of the photographic paper produce a desired positive print.

This difficulty of producing photographs having good image clarity and correct color is especially exaggerated when producing photographs from digital images. Digital images may be captured by conventional digital cameras or produced from non-digitized color photographs that are subsequently digitized by standard digital photoprocessing software. Unfortunately, photographs produced from digital images are limited in sharpness and clarity because of the digitized construction of the image itself or because of the means for exposing the image on photographic paper.

Adding to the complexity and difficulty of producing clear and color correct photographs is the commercial desire to mass produce photographs at high speeds. Depending on the type of projection device, conventional printers project digital images onto photographic paper using a line-by-line application similar to a raster technique. With this type of projection method, the line-by-line application must be synchronized with the movement of the paper web in the printer and must also account for any variance from horizontal based on the movement of the paper web. Misregistration is a common problem with this technique, and the multiple alignments required to counter misregistration is very difficult to accomplish if a desired image has high resolution. Additional operational software or algorithms are required when using this line-by-line application to offset the aforementioned variance.

Various types of projectors have been used to control the transmission of light onto the negative and to the photographic film in non-digital image photographic processing. The use of a cathode ray tube (CRT) as a means for projecting digital images for the printing of photographs is popular. With CRT projectors, two problems are presented. The first problem is the persistence of the phosphors on the face of the CRT which can cause image burn or smear. The second problem is the mismatch of the color in light that is emitted from the CRT. Current CRT projection systems are unsatisfactory because of color gamut and phosphor persistence which were not designed with photographic papers in mind. For example, conventional CRT projection systems provide a wavelength of red that is too short. Light emitted from a CRT has a much different color temperature than is desired to properly match the color response of the photographic paper. Attempting to correct this mismatch through the use of filtering the light from the CRT can produce color cross-over. This cross-over can result in printed images that do not have true color. One attempt at resolving the aforementioned problems is to incorporate a series of red, blue, and green filters with the CRT. The photographic paper is exposed multiple times with light passing through each of the filters in order to provide good resolution in the resulting photograph. Unfortunately, such procedure is slow and inefficient, particularly when used in mass photograph production.

The use of liquid crystal display (LCD) technology as a means for projecting digital images for the printing of photographs has recently gained some popularity. However, LCD projectors could require substantial optical manipulation and to accomplish the same. Further there is a limitation to the resolution and its effect on the light output. Currently, filter wheels having red-blue-green pass filters are used in combination with some LCD projectors in order to generate a colored image on photographic paper. Alternatively, three light/filter sources may be used in place of a filter wheel to provide red-blue-green light that is used to generate the colored image. Use of either the aforementioned filter wheel or the three light/filter sources requires three separate exposures thereby more consumption of time, adds to the complexity of the projection device and creates a potential source of system error in the production of color correct photographs from digital images. Additionally, such light source/filter combinations only allow for the generation of a colored image onto photographic paper that approximates the image as acquired by the system, for example by digital scanning. No color correction is provided for by these light source/filter combinations.

Depending on the lamp house that is used to produce a photographic image on the photographic paper, color correction may be necessary in order to produce a photograph with good color quality. A method for analyzing color photographs is disclosed by U.S. Pat. No. 4,676,628 ("the '628 patent"). As described in the '628 patent, the preparation of high quality prints from color negatives encounters the problem of variations in the spectral response characteristics based on particular printing paper lots and the effects of processing variables such as chemical strength, temperatures and processing times, and negative based materials. Accordingly, when a different printing paper is used for producing photographs, conventional printers must attempt to control the color content of the photographs or produce photographs having incorrect color.

What is therefore needed is a method and apparatus for creating a digital image on photographic paper and subsequent correction of color. Further needed is a digital image printer that is capable of rapidly producing digital images on photographic paper having good clarity and sharpness and correct color content. Further needed is a digital image printer having a modular controllable digital image projection device that is easily removed and easily coupled with conventional photograph printers and presents a complete image against the photographic paper without the use of a filter wheel of multiple light/filter source.

SUMMARY OF THE INVENTION

The present invention is a method and apparatus for creating a digital image on photographic paper and subsequent correction of color. The present invention provides a digital image printer that is capable of rapidly producing digital images on photographic paper having good clarity and sharpness and correct color content. Further, the present invention provides a digital image printer having a modular controllable digital image component that is easily removed and easily coupled with conventional photograph printers and presents a complete image against the photographic paper without the use of a filter wheel or multiple light/filter source.

The present invention utilizes the technology found in liquid crystal display (LCD) video projectors, digital light processing (DLP) video projectors, and direct drive image light amplifier (DILA) video projectors. This invention corrects the color content of the images to be printed. The present invention provides a method that produces true color photographs from digitized images on photograph paper. When using LCD, DLP, or DILA based imaging devices, the present invention provides the corrective means to precisely match the light. U.S. Pat. No. 4,676,628 to Asbury ("the '628 patent") discloses a method to offset the color spectrum content of the light and is incorporated by reference herein.

Further, the present invention is compatible with the use of existing reflector imaging chips to project the entire content of an image in much the same way that the image of a negative is projected onto photographic paper. The present invention allows the conversion of a standard photographic printer, such as currently used in labs throughout the world, to be able to print digital images. For example, the present invention may be adapted to Lucht Step One's, Lucht VP-2 and Lucht V7, which are devices made by Sienna-Lucht of Minnesota. The present invention may also be adapted to other similar type standard printers including Kodak S series printers, Nord Package Printers and Hicks type printers. Such printers are also manufactured to conform to standard photographic print paper using RA4 type processing. The present invention is not limited to the conversion of existing photographic printers but may be incorporated into a new printer using the aforementioned digital display devices.

In one embodiment, the invented digital printer includes a central processor for retrieving digital images stored on an electronic file and for creating a negative image of the digital images, a projector controller electrically connected to the central processor, a digital imaging device electrically connected to the projector controller for creating and transmitting a color corrected image, a lamp house positioned adjacent the digital imaging device for creating an optical signal and modulating the spectral content of the optical signal in accordance to a user's instruction, a spectral content analyzer and a lamp house controller coupled to the lamp house, a lens system for focusing the color corrected image onto photographic paper, and a paper drive having a supply and take-up for providing and advancing photographic paper. The invented digital printer may further comprise a display electrically connected to the central processor for viewing the digital images, and an enclosure for housing the components of the invented digital printer.

Digital images are inverted by the central processor which in turn instructs the projector controller to activate/deactivate portions of the digital imaging device based on the inverted digital image. The lamp house comprises a conventional lamp for providing light, a light filter system positioned adjacent the lamp that is responsive to user instruction via the lamp house controller, a heat glass positioned across the path of light emitted from the lamp, a mixing tube positioned to capture the light emitted from the lamp, a neutral density filter positioned at the light exiting end of the mixing tube and a shutter positioned between the initial density filter and the imaging means. The light filter system comprises a series of filters in order to accomplish subtractive mixing of light, which uses yellow, magenta and cyan filters, or additive mixing, which uses red, blue, and green filters. When using additive mixing three lamps corresponding to the red, blue, and green filters must be used. Light is emitted from the lamp and travels through the light filter system, through the heat glass, through the mixing tube, through the neutral density filter, through the shutter when the shutter is opened, and is directed onto the imaging device.

The light emerging from the lamp house has a desired spectral content based on the combination and position of filters in the light filter system. In one embodiment of the present invention, light is reflected by the digital imaging device through the lens system and onto the photographic paper.

The lamp house controller includes a spectral content probe that is attached to the wall of the mixing tube, an analog-to-digital (A/D) converter electrically coupled with the probe, a conventional processor electrically coupled to the A/D converter, and a display and input device that are electrically coupled to the processor. The probe detects the spectral content of light traversing through the mixing tube as an analog signal which is then converted to a digital signal by the A/D converter and transmitted to the lamp house processor. The processor then determines and quantitizes the spectral content of the light traversing the mixing tube and displays such quantified spectral content to a system user on the display. In one embodiment, the processor displays such quantified spectral content in standard photographic color correction (cc) values. The user may manipulate the spectral content in standard photographic cc values of the light traversing the mixing tube utilizing the input device. Changes to the spectral content are controlled by the lamp house processor which is electrically coupled to the filter system.

Regardless of the photographic paper type, the invented digital printer allows a digital image to be printed on photographic paper and color corrected. Further, inconsistencies in the spectral content of light that may be produced by the lamp house and caused by aging of the lamp, aging of the filter system, or any other means, may be adjusted by the lamp house controller. The present invention allows digital images to be printed on photographic paper in mass quantities and is thereby ideally suited for commercial photograph production.

OBJECTS OF THE INVENTION

The principal object of the present invention is to provide a method and apparatus for creating a digital image on photographic paper and subsequent correction of color.

Another object of the invention is to provide a digital image printer that is capable of rapidly producing digital images on photographic paper having good clarity and sharpness and correct color content.

Another, more particular object of the invention is to provide a digital image printer having a modular controllable digital image component that is easily removed from the digital image printer and that may be coupled with conventional photograph printers.

Another, more particular object of the invention is to provide a modular removable digital image component that presents a complete image against the photographic paper without the use of a filter wheel or multiple light/filter source.

BRIEF DESCRIPTION OF THE DRAWINGS

The foregoing and other objects will become more readily apparent by referring to the following detailed description and the appended drawings in which:

FIG. 3 is a block diagram of one embodiment of the digital image projection system in accordance with one embodiment of the present invention.

DETAILED DESCRIPTION

The present invention is a method and apparatus for creating a digital image on photographic paper and subsequent correction of color. The present invention provides a digital image printer that is capable of rapidly producing digital images on photographic paper having good clarity and sharpness and correct color content. Further, the present invention provides a digital image printer having a modular controllable lamp house that is easily removable from the printer, may be coupled with conventional photograph printers, and presents a complete image against the photographic paper without the use of a filter wheel of multiple light/filter source.

The present invention utilizes the technology found in liquid crystal display (LCD) video projectors, digital light processing (DLP) video projectors, such as manufactured by Texas Instruments, and direct drive image light amplifier (DILA) video projectors, such as manufactured by Hughes-JVC. The present invention corrects the color content of the images to be printed. The present invention provides a method that produces true color photographs from digitized images on photograph paper. When using LCD, DLP, or DILA based imaging devices, the present invention provides the corrective means to precisely match the light. U.S. Pat. No. 4,676,628 to Asbury ("the '628 patent") discloses a method to offset the color spectrum content of the light and is hereby incorporated herein.

Further, the present invention is compatible with existing reflector imaging chips to project the entire content of an image in much the same way that the image of a negative is projected onto photographic paper. The present invention allows the conversion of a standard photographic printer, such as currently used in labs throughout the world, to be able to print digital images. For example, the present invention may be adapted to Lucht Step One's, Lucht VP-2 and Lucht V7, which are devices made by Sienna-Lucht of Minnesota. The present invention may also be adapted to other similar type standard printers including Kodak S series printers, Nord package Printers and Hicks type printers. Such printers are also manufactured to conform to standard photographic print paper using RA4 type processing. The present invention is not limited to the conversion of existing photographic printers but may be incorporated into a new printer using the aforementioned digital display devices.

Figure 1:
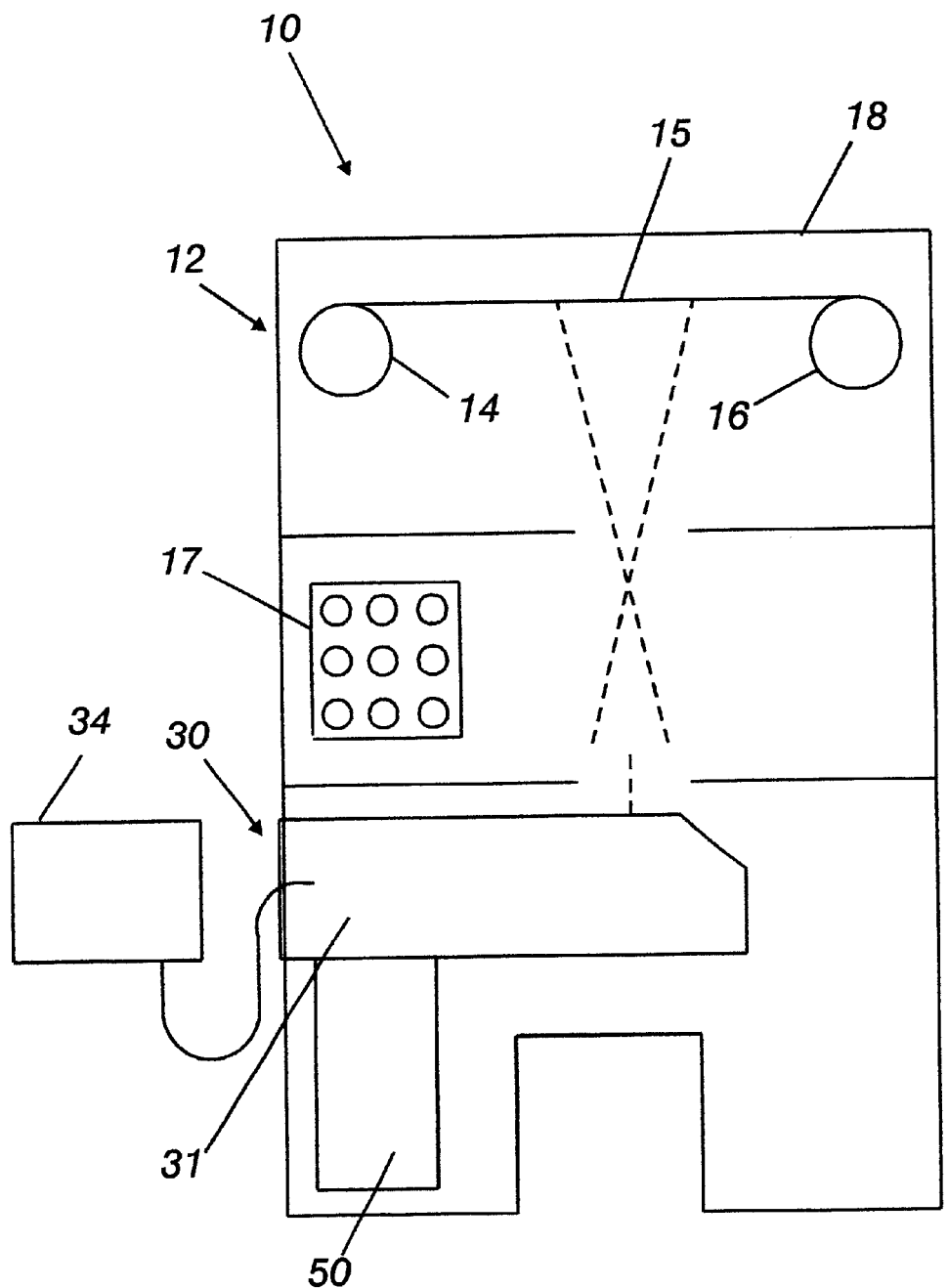
FIG. 1 is a schematic block diagram of a digital image printer having a removable digital imaging component in accordance with the present invention.

Referring now to the drawings, FIG. 1 is a schematic block diagram of a digital image printer, shown generally at 10, having a removable digital imaging component in accordance with the present invention. The invented digital image printer 10 includes a paper drive, shown generally at 12, having a supply reel 14 and a take-up reel 16 for providing and advancing photographic paper 15, a modular removable digital image component, shown generally at 30, an enclosure 18 for housing the components of the invented digital printer 10, and a printer controller 17. The invented digital printer 10 may further include displays 20, 21 (FIG. 2) electrically connected to the digital image component 30 for viewing digital images. Any type of conventional photographic paper may be carried by the paper drive 12. Although the present invention is described in terms of a digital printer, the modular digital image component may be removably incorporated with existing conventional printers, such as the aforementioned printers. The present invention is ideally suited to provide standard non-digital image printers with digital image printing capability at a low cost.

Figure 2:
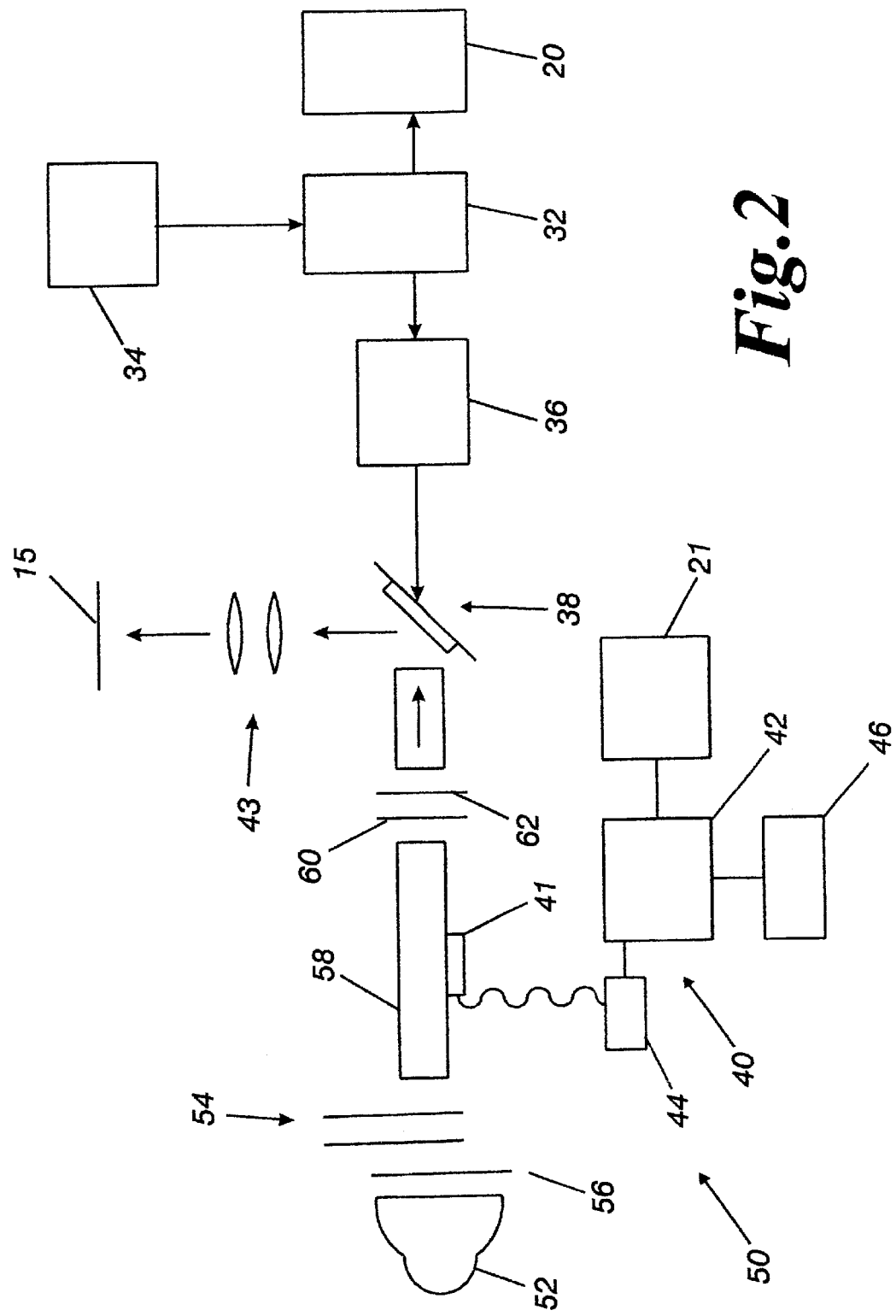
FIG. 2 is a schematic diagram of a digital image projection system in accordance with the present invention.

FIG. 2 is a schematic diagram of a digital image projection system in accordance with the present invention. The digital imaging component 30 comprises a central processor 32 for retrieving digital images stored on an electronic file, for example in a server buffer 34, and for creating an inverted image of the digital images, a projection controller 36 electrically connected to the central processor 32, a digital imaging device 38 electrically connected to the projection controller 36 for transmitting a high brightness/high resolution optical signal, a lamp house, shown generally at 50, positioned adjacent the digital imaging device 38 for creating an optical signal and modulating the spectral content of the optical signal, a spectral content analyzer and a lamp house controller, shown generally at 40, coupled to the lamp house 50, a lens system, shown generally at 43, for focusing the color corrected image onto the photographic paper 15, and a projector enclosure 31 for housing the digital imaging component 30. The aforementioned display 20 is preferably electrically connected to the central processor 32 to display the retrieved digital images.

The central processor 32 may be a conventional mainframe computer, minicomputer, microcontroller, or microprocessor, that is electrically connected to an internal or external memory device, such as a secondary hard drive, direct access storage device (DASD), a magnetic tape storage device, an optical storage device or archived tape. The digital images are preferably stored in a memory device and retrieved by the central processor 32 when photographs are desired to be produced from the digital images.

The retrieved digital images, for example opened image files, are inverted by the central processor 32 which in turn instructs the projection control 36 display the opened image file on the imaging device 38 based on the inverted digital image in order to produce a correct image for exposure onto the photographic paper. The digital imaging device 38 is selected from an LCD projector, a DLP projector or a DILA projector, and preferably is a DILA projector. The lamp house 50 comprises a conventional full color spectrum lamp 52 for providing light, a light filter system, shown generally at 54, positioned adjacent the lamp 52, a heat glass, shown generally at 56, positioned across the path of light emitted from the lamp 52, a mixing tube 58 positioned to capture the light emitted from the lamp 52, a neutral density filter 60 positioned at the light exiting end of the mixing tube 58 and a shutter 62 that is positioned between the neutral density filter 60 and the imaging device 38. Light is emitted from the lamp 52 and travels through the light filter system 54, through the heat glass 56, through the mixing tube 58, through the neutral density filter 60, through the shutter 62 when the shutter is opened, and is directed to the imaging device 38. The light filter system 54 comprises a series of filters in order to accomplish subtractive mixing of light, which uses using yellow, magenta and cyan filters, or additive mixing of light, which uses red, blue, and green filters.

The neutral density filter 60 is used to adjust the amount of light emerging from the lamp house 50 and is preferably an iris mechanism. In one embodiment of the invention, the use of the cyan filter, when used in combination with the yellow and magenta filter, would act to replace the neutral density filter.

The mixing tube 58 is preferably a solid cylindrical rod made of a substantially transparent material, including but not limited to glass, plexiglass or a thermoplastic acrylic resin selected from the group consisting of methyl acrylate, acrylamide, methylol acrylamide, acrylonitrile, polyacrylonitrile (PAN), polymethacrylonitrile (PMAN), polyacrylonitrile-methylmethacrylate (P[AN-MMA]), polymethylacrylate (PMA), polyethylacrylate (PEA), polybutylacrylate (PBA) and polymethylmethacrylate (PMMA). In one embodiment, the spectral content analyzer is coupled to the mixing tube 58 to acquire and analyze the spectral content of light passing through the tube 58. Although a mixing tube is described for capturing and analyzing light passing therethrough, alternative light capturing devices may be used, including but not limited to non-cylindrical solid tubes and chambers.

When the modular digital imaging component is coupled with a printer, as best shown in FIG. 1, the shutter 62 is electronically timed with the advancement of the photographic paper by the paper drive 12 and with the lamp actuation, and preferably allows color corrected light to emerge from the lamp house 50 when the quality of the light emitted from the lamp 52 is at a peak. The light emerging from the lamp house 50 has a desired spectral content based on the combination and position of filters in the light filter system 54. Light is projected or reflected by the imaging device 38 and focused by the lens system 43 onto the photographic paper 15.

The lamp house controller 40 includes a spectral content probe 41 that is attached to the wall of the mixing tube 58, an analog to digital (A/D) converter 44 electrically coupled with the probe 41, a conventional processor 42 electrically coupled to the A/D converter 44, a display 21, and a input device 46 that are electrically coupled to the processor 42. The probe 41 detects the spectral content of light traversing through the mixing tube 58 as an analog signal which is then converted to a digital signal by the A/D converter 44 and transmitted to the lamp house processor 42. The processor 42, using an associated operating software determines and quantitizes the spectral content of the light traversing the mixing tube 58 and displays such quantified spectral content to a system user on the display 21. The display 21 may be a conventional monitor, and the input device 46 may be a conventional keyboard and/or mouse. The user manipulates the spectral content of the light in standard photographic cc values traversing the mixing tube 58 by utilizing the input device 46. Changes to the spectral content are controlled by the lamp house processor 42 which is electrically coupled to the filter system 54. In one embodiment, the lamp house processor 42 activates/deactivates motors 70 (FIG. 3) that are coupled to the filters in the filter system 54 to place/displace the filters in the path of light from the lamp 52.

Regardless of the photographic paper type, the invented digital printer 10 allows a color corrected digital image to be printed on photographic paper. Further, inconsistencies in the spectral content of light that may be produced by a lamp house and caused by aging of a lamp or aging of a filter system are automatically corrected by the lamp house processor 42. The present invention allows digital images to be printed on photographic paper in mass quantities and is thereby ideally suited for commercial photograph production. The digital images that are printed on the photographic paper are positive prints.

EXAMPLE

FIG. 3 is a block diagram of one embodiment of the digital image projection system in accordance with one embodiment of the present invention. Light is supplied from a 3200° F. conventional lamp that passes through a heat glass 56. A blue/yellow filter and a green/magenta filter are used in the filter system 54 that each are coupled to a motor 70 in order to place/displace the filters in the path of light from the lamp 52 in accordance with a desired color correction. The filtered light enter the mixing chamber 58 which has a spectral probe 41 coupled therewith. The probe 41 transmits the spectral characteristics of the light passing through the mixing chamber 58 to the lamp house processor 42 using a conventional A/D card 44 that interconnects the probe 41 with the lamp house processor 42.

A display 21 is electronically connected to the lamp house processor 42 via a conventional video card 77 to provide information regarding the spectral characteristics of the light in the mixing chamber 58. Depending on user preferences, photographic paper type and system balancing factors, the user may modify the light transmitted to the digital imaging component 30 by entering instructions using an input device 46, such as a keyboard or mouse) that is attached to the lamp house controller 42. These instructions are received and interpreted by the lamp house processor 42 which in turn activates/deactivates the motors 70 using a conventional motor controller, shown generally at 78.

The motor controller 78 includes a power supply 76, a motor board 72, and an return to balance (RTB) interface 74 that interconnects the motor board 72 with the lamp house processor 42. The power supply provides electrical power to the probe 41, motor board 72 and RTB interface 74. The lamp house processor 42 and motor controller 48 allow user modifications, such as color correction, to be realized in real time because the characteristics of the filtered light are immediately displayed on the display 21. Once the desired characteristics of the light are attained, the filtered light is transmitted to the DILA imaging device for projection onto the photographic paper.

SUMMARY OF THE ACHIEVEMENT OF THE OBJECTS OF THE INVENTION

From the foregoing, it is readily apparent that I have invented a method and apparatus for creating a digital image on photographic paper and subsequent correction of color. The present invention provides a digital image printer that is capable of rapidly producing digital images on photographic paper having good clarity and sharpness and correct color content. The present invention provides a digital image printer having a modular controllable digital image component that is easily removed from and may be coupled with conventional photograph printers.

It is to be understood that the foregoing description and specific embodiments are merely illustrative of the best mode of the invention and the principles thereof, and that various modifications and additions may be made to the apparatus by those skilled in the art, without departing from the spirit and scope of this invention which is intended to be limited only by the scope of the appended claims.

What is claimed is:

1. A removable modular digital imaging apparatus for coupling with a photographic printer and for color correction of digital images, said apparatus comprising:
   a lamp house for generating an optical signal and modulating the spectral content of the optical signal;
   a digital imaging device positioned adjacent said lamp house, said digital imaging device receiving the modulated optical signal from said lamp house and transmitting a high brightness/high resolution optical signal based on said modulated optical signal;
   a lens system for focusing the transmitted optical signal from said digital imaging device onto photographic paper;
   a central processor for retrieving digital images and producing inverted digital images;
   a projection controller electrically connected to said digital imaging device for displaying the opened image file on said digital imaging device based on the inverted digital images; and
   a lamp house controller electrically coupled to said lamp house for determining and controlling the spectral content of the optical signal transmitted from said lamp house.

2. An apparatus in accordance with claim 1 further comprising:
   a display electrically connected to said central processor for displaying the digital images retrieved by said central processor.

3. An apparatus in accordance with claim 1 further comprising:
   a display electrically connected to said lamp house controller for displaying the spectral characteristics of the optical signal generated by said lamp house in standard photographic color corrected values.

4. An apparatus in accordance with claim 1 wherein said digital imaging device is selected from the group consisting of a liquid crystal display (LCD) projector, a digital light processing projector, and a direct drive image light amplifier.

5. An apparatus in accordance with claim 1 wherein said lamp house comprises:
   a lamp for emitting light and directing the emitted light along a path to said digital imaging device;
   a light filter system positioned adjacent said lamp for manipulating the spectral content of the emitted light;
   a light mixing chamber positioned between said lamp and said imaging means, said mixing tube having a pair of opposed ends, one end positioned adjacent said light filter system; and
   a shutter positioned between said mixing chamber and said imaging means for selectively obstructing and passing light emitted from said lamp and transmitted through said mixing chamber.

6. An apparatus in accordance with claim 5 further comprising:
   a heat glass interposed between said lamp and said mixing chamber; and
   a neutral density filter interposed between said mixing chamber and said shutter.

7. An apparatus in accordance with claim 5, wherein said mixing chamber is a mixing tube.

8. An apparatus in accordance with claim 7 wherein said mixing tube comprises a substantially transparent solid rod having frosted ends.

9. An apparatus in accordance with claim 8 wherein said mixing tube is made of a thermoplastic acrylic resin selected from the group consisting of methyl acrylate, acrylamide, methylol acrylamide, acrylonitrile, polyacrylonitrile (PAN), polymethacrylonitrile (PMAN), polyacrylonitrile-methylmethacrylate (P[AN-MMA]), polymethylacrylate (PMA), polyethylacrylate (PEA), polybutylacrylate (PBA) and polymethylmethacrylate (PMMA).

10. An apparatus in accordance with claim 5 wherein said filter system is selected from the group consisting of a subtractive mixing filter system and an additive mixing filter system.

11. An apparatus in accordance with claim 10 wherein said subtractive mixing filter system comprises:
    a yellow filter;
    a magenta filter; and
    a cyan filter;
    wherein said yellow filter, said magenta filter and said cyan filter are each removably inserted across the path of the light emitted from said lamp.

12. An apparatus in accordance with claim 10 wherein said additive mixing filter system comprises:
    a red filter;
    a blue filter; and
    a green filter;
    wherein said red filter, said blue filter and said green filter are each positioned in front of separate lamps.

13. An apparatus in accordance with claim 7 wherein said lamp house controller comprises:
    a spectral content probe attached to the wall of said mixing tube;
    an analog-to-digital (A/D) converter electrically connected to said spectral content probe;
    a lamp house processor electrically connected to said A/D converter and to said filter system;
    a display electrically connected to said lamp house processor for displaying the spectral content of the light passing through said mixing tube; and
    an input device for modifying the spectral content of the light passing through said mixing tube.

14. An apparatus for printing digital images on photographic paper, said apparatus comprising:
    a paper drive for providing and positioning photographic paper for production of photographs;
    a removable modular digital imaging apparatus for coupling with said printing apparatus and for color correction of digital images, said digital imaging apparatus comprising:
      a lamp house for generating an optical signal and modulating the spectral content of the optical signal;
      a digital imaging device positioned adjacent said lamp house, said digital imaging device receiving the modulated optical signal from said lamp house and transmitting a high brightness/high resolution optical signal based on said modulated optical signal;
      a lens system for focusing the transmitted optical signal from said digital imaging device onto photographic paper;
      a central processor for retrieving digital images and producing inverted digital images;
      a projection controller electrically connected to said digital imaging device for displaying the opened image file on said digital imaging device based on the inverted digital images; and a lamp house controller electrically coupled to said lamp house for determining and controlling the spectral content of the optical signal transmitted from said lamp house;

a printer controller for synchronizing said paper drive and said digital imaging apparatus; and an enclosure for housing said paper drive, said digital imaging apparatus and said printer controller.

15. An apparatus in accordance with claim 14 wherein said paper drive comprises:

a supply reel;

a take-up reel; and a motor coupled to said take-up reel for.

16. An apparatus in accordance with claim 14 further comprising:

a display electrically connected to said central processor for displaying the digital images retrieved by said central processor.

17. An apparatus in accordance with claim 14 further comprising:

a display electrically connected to said lamp house controller for displaying the spectral characteristics of the optical signal generated by said lamp house in standard photographic color corrected values.

18. An apparatus in accordance with claim 14 wherein said digital imaging device is selected from the group consisting of a liquid crystal display (LCD) projector, a digital light processing projector, and a direct drive image light amplifier.

19. An apparatus in accordance with claim 14 wherein said lamp house comprises:

a lamp for emitting light and directing the emitted light along a path to said digital imaging device;

a light filter system positioned adjacent said lamp for manipulating the spectral content of the emitted light;

a light mixing chamber positioned between said lamp and said imaging means, said mixing tube having a pair of opposed ends, one end positioned adjacent said light filter system; and a shutter positioned between said mixing chamber and said imaging means for selectively obstructing and passing light emitted from said lamp and transmitted through said mixing chamber.

20. An apparatus in accordance with claim 19 further comprising:

a heat glass interposed between said lamp and said mixing chamber; and a neutral density filter interposed between said mixing chamber and said shutter.

\* \* \* \* \*